United States Patent
Igarashi et al.

(10) Patent No.: US 11,637,305 B2
(45) Date of Patent: Apr. 25, 2023

(54) POWER GENERATION CONTROL SYSTEM, POWER GENERATION CONTROL METHOD, AND STORAGE MEDIUM

(71) Applicant: HONDA MOTOR CO., LTD., Tokyo (JP)

(72) Inventors: Daishi Igarashi, Wako (JP); Akiji Ando, Wako (JP); Nobutaka Nakajima, Wako (JP); Kenji Taruya, Wako (JP); Joji Nakashima, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 16 days.

(21) Appl. No.: 17/408,558

(22) Filed: Aug. 23, 2021

(65) Prior Publication Data
US 2022/0077481 A1 Mar. 10, 2022

(30) Foreign Application Priority Data
Sep. 4, 2020 (JP) .............................. JP2020-149033

(51) Int. Cl.
H01M 8/04 (2016.01)
H01M 8/04955 (2016.01)
H01M 16/00 (2006.01)
H01M 8/04537 (2016.01)
H01M 8/04858 (2016.01)
H01M 8/04302 (2016.01)
(Continued)

(52) U.S. Cl.
CPC ..... *H01M 8/04955* (2013.01); *H01M 8/0494* (2013.01); *H01M 8/04302* (2016.02); *H01M 8/04303* (2016.02); *H01M 8/04365* (2013.01); *H01M 8/04626* (2013.01); *H01M 10/48* (2013.01); *H01M 16/006* (2013.01); *H01M 2220/20* (2013.01); *H01M 2250/20* (2013.01)

(58) Field of Classification Search
CPC ........ H01M 8/04955; H01M 8/04302; H01M 8/04303; H01M 8/04365; H01M 8/04626; H01M 8/0494; H01M 2250/20
USPC .......................................................... 429/9
See application file for complete search history.

(56) References Cited

U.S. PATENT DOCUMENTS

2010/0209794 A1 8/2010 Kajiwara et al.
2016/0141674 A1 5/2016 Shiokawa et al.
(Continued)

FOREIGN PATENT DOCUMENTS

DE 10 2015 118 972 7/2016
DE 10 2017 124 833 10/2018
(Continued)

OTHER PUBLICATIONS

Japanese Office Action for Japanese Patent Application No. 2020-149033 dated Apr. 5, 2022.
(Continued)

*Primary Examiner* — James M Erwin
(74) *Attorney, Agent, or Firm* — Amin, Turocy & Watson, LLP

(57) ABSTRACT

A power generation control system includes a plurality of fuel cell systems mounted in an electric device that operates using electric power, a battery mounted in the electric device, and a control device configured to control each of the plurality of fuel cell systems on the basis of states of the plurality of fuel cell systems, a state of the battery, and required power of the plurality of fuel cell systems.

11 Claims, 11 Drawing Sheets

(51) Int. Cl.
 *H01M 8/0432* (2016.01)
 *H01M 10/48* (2006.01)
 *H01M 8/04303* (2016.01)

(56) References Cited

U.S. PATENT DOCUMENTS

| | | | |
|---|---|---|---|
| 2018/0294495 A1 | 10/2018 | Park et al. | |
| 2018/0339604 A1 | 11/2018 | Brown et al. | |
| 2020/0112041 A1* | 4/2020 | Ito | H01M 16/00 |
| 2020/0403256 A1* | 12/2020 | Itou | H01M 8/249 |

FOREIGN PATENT DOCUMENTS

| | | |
|---|---|---|
| DE | 11 2008 002 742 | 3/2020 |
| DE | 11 2018 002 683 | 12/2021 |
| JP | 2008-084688 | 4/2008 |
| JP | 2011-175963 | 9/2011 |
| JP | 2016-103460 | 6/2016 |
| JP | 2020-031029 | 2/2020 |

OTHER PUBLICATIONS

German Office Action for German Patent Application No. 102021122055.6 dated Jun. 14, 2022.

\* cited by examiner

FIG. 13

| THRESHOLD VALUE NO. | THRESHOLD VALUE |
|---|---|
| FIRST THRESHOLD VALUE | SOC15 |
| SECOND THRESHOLD VALUE | SOC13 |
| THIRD THRESHOLD VALUE | W25 [W] |
| FOURTH THRESHOLD VALUE | W23 [W] |
| FIFTH THRESHOLD VALUE | TIth [MINUTES] |
| SIXTH THRESHOLD VALUE | Tth [DEGREES] |
| SEVENTH THRESHOLD VALUE | Soth [%] |

POWER GENERATION CONTROL SYSTEM, POWER GENERATION CONTROL METHOD, AND STORAGE MEDIUM

CROSS-REFERENCE TO RELATED APPLICATION

Priority is claimed on Japanese Patent Application No. 2020-149033, filed Sep. 4, 2020, the content of which is incorporated herein by reference.

BACKGROUND OF THE INVENTION

Field of the Invention

The present invention relates to a power generation control system, a power generation control method, and a storage medium.

Description of Related Art

Conventionally, technology for controlling power generation of a fuel cell system on the basis of required power calculated on the basis of an amount of accelerator depression, a temperature of a secondary battery, and a stored amount of power is known as technology related to a fuel cell system mounted in a vehicle (for example, Japanese Unexamined Patent Application, First Publication No. 2016-103460).

SUMMARY OF THE INVENTION

However, control when a plurality of fuel cell systems are installed in a vehicle has not been taken into account. Therefore, deterioration in each of the fuel cell systems may be uneven according to a control method.

Aspects of the present invention have been made in consideration of such circumstances and an objective of the present invention is to provide a power generation control system, a power generation control method, and a storage medium capable of limiting the overall deterioration in a plurality of fuel cell systems.

In order to achieve the objective by solving the above-described problems, the present invention adopts the following configurations.

(1): According to an aspect of the present invention, there is provided a power generation control system including: a plurality of fuel cell systems mounted in an electric device that operates using electric power; a battery mounted in the electric device; and a control device configured to control each of the plurality of fuel cell systems on the basis of states of the plurality of fuel cell systems, a state of the battery, and required power of the plurality of fuel cell systems.

(2): In the above-described aspect (1), the control device may determine a fuel cell system to be operated among the plurality of fuel cell systems on the basis of a result of comparing the required power with a threshold value.

(3): In the above-described aspect (2), the control device may determine a fuel cell system to be stopped among the plurality of fuel cell systems when the result of comparing the required power with the threshold value indicates that the required power is less than the threshold value.

(4): In the above-described aspect (1), the control device may determine a fuel cell system to be operated among the plurality of fuel cell systems on the basis of a result of comparing the required power with a threshold value.

(5): In the above-described aspect (4), the control device may determine a fuel cell system to be stopped among the plurality of fuel cell systems when a result of comparing the state of the battery with the threshold value indicates that a state of charge (SOC), which is the state of the battery, is greater than or equal to the threshold value.

(6): In the above-described aspect (1), the control device may determine a fuel cell system to be operated or stopped among the plurality of fuel cell systems on the basis of both the required power and the state of the battery.

(7): In the above-described aspect (2) or (3), the control device may select a fuel cell system to be operated from among the plurality of fuel cell systems on the basis of a result of comparing a power generation time period of each of the plurality of fuel cell systems with a threshold value.

(8): In the above-described aspect (7), the control device may select a fuel cell system to be stopped from among the plurality of fuel cell systems whose power generation time periods are greater than or equal to the threshold value indicated in the result of comparing the power generation time period of each of the plurality of fuel cell systems with the threshold value (9): In the above-described aspect (2) or (3), the control device may select a fuel cell system to be operated from among the plurality of fuel cell systems on the basis of a result of comparing temperatures of the plurality of fuel cell systems with a threshold value.

(10): In the above-described aspect (9), the control device may select a fuel cell system to be stopped from among the plurality of fuel cell systems when the result of comparing the temperatures of the plurality of fuel cell systems with the threshold value indicates that the temperature is greater than or equal to the threshold value.

(11): In the above-described aspect (1), the control device may select a fuel cell system to be operated or stopped from among the plurality of fuel cell systems on the basis of a result of comparing charge rates of fuel cells provided in the plurality of fuel cell systems with a threshold value.

(12): According to an aspect of the present invention, there is provided a power generation control method including: controlling, by a computer, each of a plurality of fuel cell systems mounted in an electric device that operates using electric power on the basis of states of the plurality of fuel cell systems, a state of a battery mounted in the electric device, and required power of the plurality of fuel cell systems.

(13): According to an aspect of the present invention, there is provided a program for causing a computer to: control each of a plurality of fuel cell systems mounted in an electric device that operates using electric power on the basis of states of the plurality of fuel cell systems, a state of a battery mounted in the electric device, and required power of the plurality of fuel cell systems.

According to the above-described aspects (1) to (13), it is possible to limit the overall deterioration in a plurality of fuel cell systems.

BRIEF DESCRIPTION OF THE DRAWINGS

FIG. 13 is a diagram showing an example of information stored in a storage portion according to the embodiment.

DETAILED DESCRIPTION OF THE INVENTION

Hereinafter, embodiments of the present invention will be described with reference to the drawings. Hereinafter an example in which a power generation control system is mounted in an electric device will be described. The electric vehicle is, for example, a fuel cell vehicle using electric power generated in a fuel cell as electric power for traveling or electric power for operating an in-vehicle device. The electric vehicle is an example of the electric device that operates using electric power and electric vehicles are automobiles such as two-wheeled vehicles, three-wheeled vehicles, and four-wheeled vehicles. The electric vehicle may be, for example, a large vehicle such as a bus or a truck that can be equipped with a plurality of fuel cell systems to be described below. The power generation control systems may be mounted in electric devices (e.g., ships, flying objects, and robots) other than electric vehicles or may be mounted in stationary fuel cell systems.

[Electric Vehicle]

Figure 1:
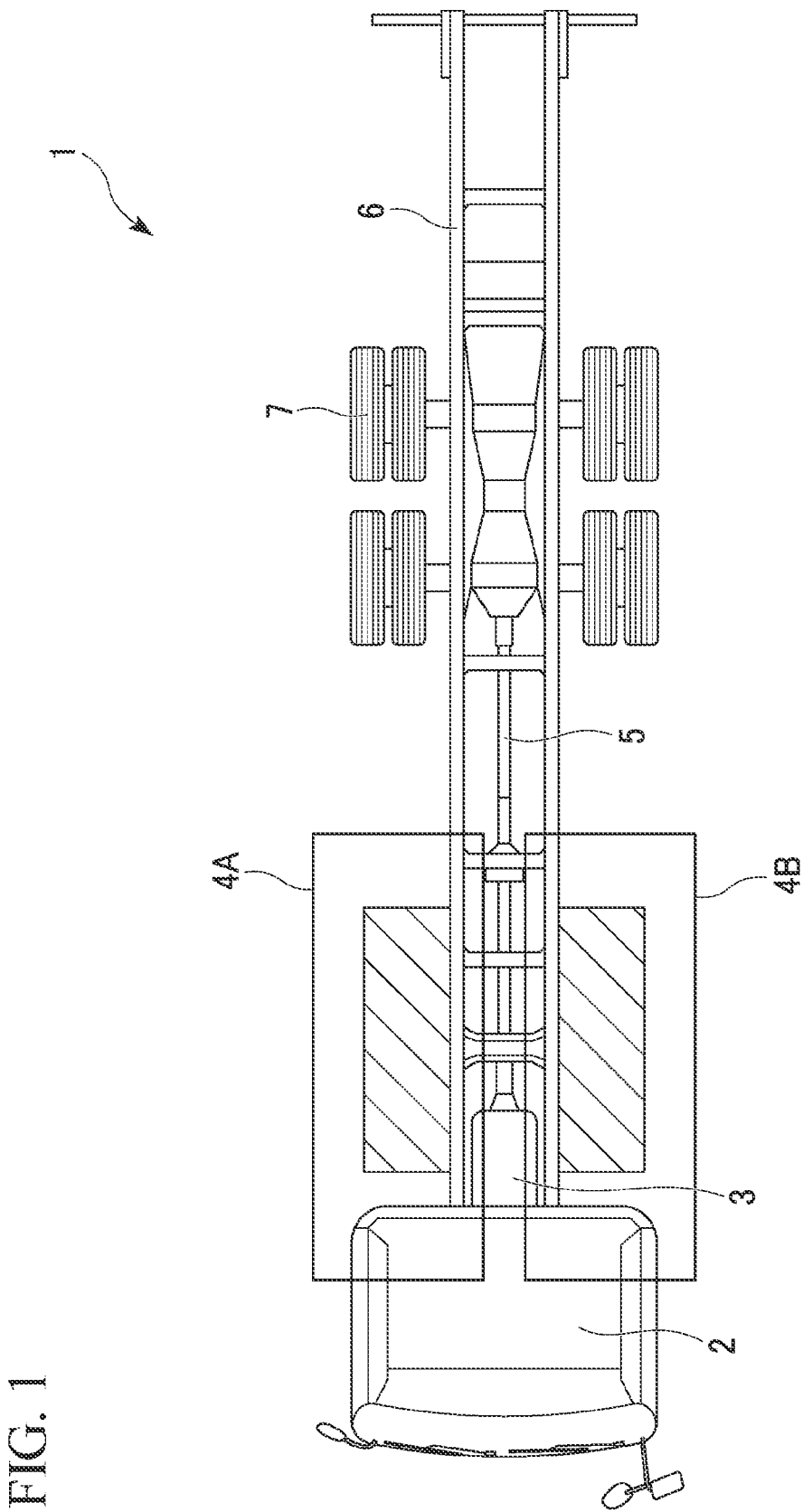
FIG. 1 is a diagram showing an example of a schematic configuration of an electric vehicle according to an embodiment.

FIG. 1 is a diagram showing an example of a schematic configuration of an electric vehicle 1 according to the present embodiment. As shown in FIG. 1, the electric vehicle 1 includes a cab 2, a transmission 3, a unit 4A, a unit 4B, a shaft 5, a frame 6, and wheels 7.

The cab 2 is a part including a driver's seat and the like. The transmission 3 is a gearbox. The units 4A and 4B include a fuel cell system. In the following description, when one of the units 4A and 4B is not specified, it is referred to as a unit 4. The shaft 5 is, for example, a propeller shaft, which is a component that connects the transmission 3 and gears connected to the wheels 7. The schematic configuration of the electric vehicle 1 shown in FIG. 1 is an example and the configuration is not limited thereto. For example, the number of units 4 is not limited to two and it is only necessary for the number of units 4 to be one or more.

[Units]

Figure 2:
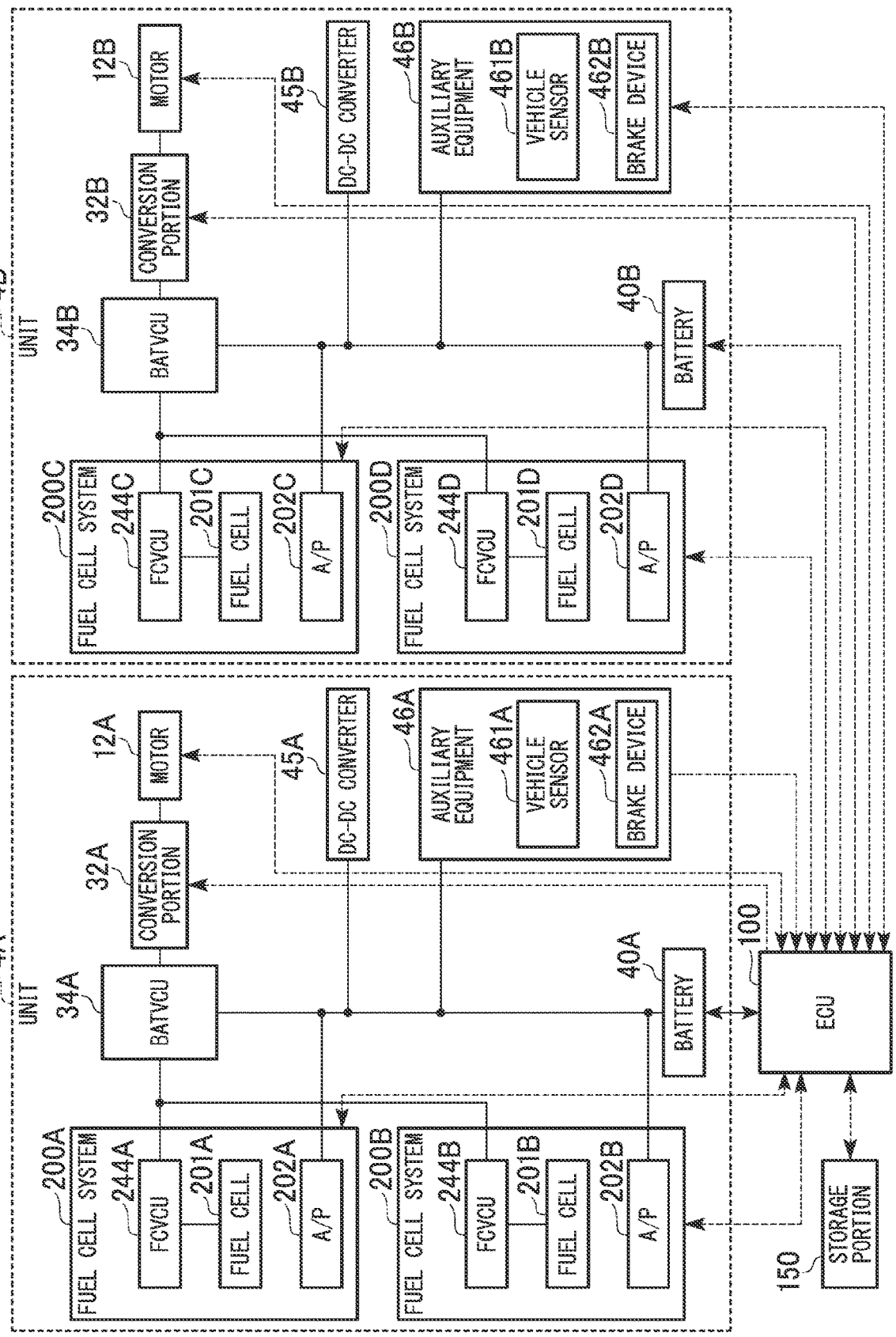
FIG. 2 is a block diagram showing an example of a configuration including units according to the embodiment.

Next, an example of a configuration of the units 4 will be described. FIG. 2 is a block diagram showing an example of a configuration including the units 4 according to the present embodiment. As shown in FIG. 2, the unit 4A includes a fuel cell system 200A, a fuel cell system 200B, a battery voltage control unit (BATVCU) 34A, a conversion portion 32A, a motor 12A, a direct current (DC)-DC conversion portion 45A, auxiliary equipment 46A, and a battery 40A. The unit 4B includes a fuel cell system 200C, a fuel cell system 200D, a BATVCU 34B, a conversion portion 32B, a motor 12B, a DC-DC conversion portion 45B, auxiliary equipment 46B, and a battery 40B.

The units 4A and 4B are connected to an electronic control unit (ECU) 100. A storage portion 150 is connected to the ECU 100. The ECU 100 is an example of a control device or a control portion.

A fuel cell system 200A includes a fuel cell voltage control unit (FCVCU) 244A, a fuel cell 201A, and an A/P 202A. A fuel cell system 200B includes an FCVCU 244B, a fuel cell 201B, and an A/P 202B. A fuel cell system 200C includes an FCVCU 244C, a fuel cell 201C, and an A/P 202C. A fuel cell system 200D includes an FCVCU 244D, a fuel cell 201D, and an A/P 202D.

In the following description, when one of the fuel cell system 200A, the fuel cell system 200B, the fuel cell system 200C, and the fuel cell system 200D is not specified, it is referred to as a fuel cell system 200. When one of the BATVCU 34A and the BATVCU 34B is not specified, it is referred to as a BATVCU 34. When one of the motor 12A and the motor 12B is not specified, it is referred to as a motor 12. When one of the control portion 80A and the control portion 80B is not specified, it is referred to as a control portion 80. When one of the DC-DC conversion portion 45A and the DC-DC conversion portion 45B is not specified, it is referred to as a DC-DC conversion portion 45. When one of the auxiliary equipment 46A and the auxiliary equipment 46B is not specified, it is referred to as auxiliary equipment 46. When one of the battery 40A and the battery 40B is not specified, it is referred to as a battery 40. When one of the FCVCU 244A, the FCVCU 244B, the FCVCU 244C, and the FCVCU 244D is not specified, it is referred to as an FCVCU 244. When one of the fuel cell 201A, the fuel cell 201B, the fuel cell 201C, and the fuel cell 201D is not specified, it is referred to as a fuel cell 201. When one of the A/P 202A, the A/P 202B, the A/P 202C, and the A/P 202D is not specified, it is referred to as an A/P 202.

The FCVCU 244 is, for example, a step-up DC-DC converter that boosts the voltage of the fuel cell 201. The fuel cell 201 is, for example, an energy source using hydrogen as power generation energy. The A/P 202 is an air pump. An example of a detailed configuration of the fuel cell system 200 will be described below.

The battery 40 is an energy source and is, for example, a battery capable of being repeatedly charged and discharged, such as a nickel-hydrogen battery, a lithium-ion secondary battery, and a sodium-ion battery. The battery 40 includes a battery sensor that detects a current value, a voltage value, and a temperature of the battery 40. For example, the battery 40 may be configured to be connected to an external charging facility and charged with electric power supplied from a charging/discharging device.

The BATVCU 34 is, for example, a step-up DC-DC converter. The BATVCU 34 boosts a DC voltage supplied from the battery 40 and supplies the boosted DC voltage to the conversion portion 32. The BATVCU 34 outputs a regenerative voltage supplied from the motor 12 or the electric power supplied from the fuel cell system 200 to the battery 40.

The DC-DC conversion portion 45 performs DC-DC conversion. The DC-DC conversion portion 45 converts, for example, the DC voltage output by the battery 40 into a DC voltage of 12 V.

The auxiliary equipment 46 is another in-vehicle device or the like, and includes, for example, a vehicle sensor 461 (vehicle sensors 461A and 461B), a brake device 462 (brake devices 462A and 462B), and the like. The vehicle sensor 461 may include an acceleration sensor that detects the acceleration of the electric vehicle 1, a yaw rate sensor that detects an angular velocity around a vertical axis, a direction sensor that detects a direction of the electric vehicle 1, and the like. The vehicle sensor 461 may include a position sensor that detects a position of the electric vehicle 1. The position sensor acquires position information of the electric vehicle 1 from, for example, a global navigation satellite system (GNSS) receiver or a global positioning system (GPS) receiver mounted in the electric vehicle 1. The vehicle sensor 461 may include a temperature sensor that measures a temperature of the fuel cell system 200.

The ECU 100 controls each of the plurality of fuel cell systems 200 on the basis of, for example, states of the plurality of fuel cell systems 200, states of the batteries 40, and required power of the plurality of fuel cell systems 200. For example, the ECU 100 compares the required power with a threshold value stored in the storage portion 150, and controls each of the plurality of fuel cell systems 200 on the basis of a comparison result. The ECU 100 compares the state of the battery 40 with the threshold value of the storage portion 150 and controls each of the plurality of fuel cell systems 200 on the basis of a comparison result. An example of a control method will be described below. The ECU 100 controls the conversion portion 32A, the motor 12A, the conversion portion 32B, and the motor 12B. The unit 4A may include the control portion 80A (80) (not shown) and the unit 4B may include the control portion 80B (80) (not shown). In this case, the control portion of the unit 4A may control the conversion portion 32A and the motor 12A according to the control of the ECU 100. The control portion of the unit 4B may control the conversion portion 32B and the motor 12A according to the control of the ECU 100.

The storage portion 150 stores, for example, various types of threshold values to be used by the ECU 100 at the time of control, a program to be used by the ECU 100 for control, and the like. The storage portion 150 is implemented by, for example, a hard disk drive (HDD), a flash memory, an electrically erasable programmable read-only memory (EE-PROM), a read-only memory (ROM), a random access memory (RAM), or the like.

The ECU 100 is implemented, for example, by a hardware processor such as a central processing unit (CPU) executing a program (software). Some or all of the above components may be implemented by hardware (including a circuit; circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as an HDD or a flash memory of the electric vehicle 1 or may be stored in a removable storage medium such as a DVD or a CD-ROM and installed in the HDD or the flash memory, which is, for example, the storage portion 150, when the storage medium (the non-transitory storage medium) is mounted in a drive device.

[Fuel Cell System]

Figure 3:
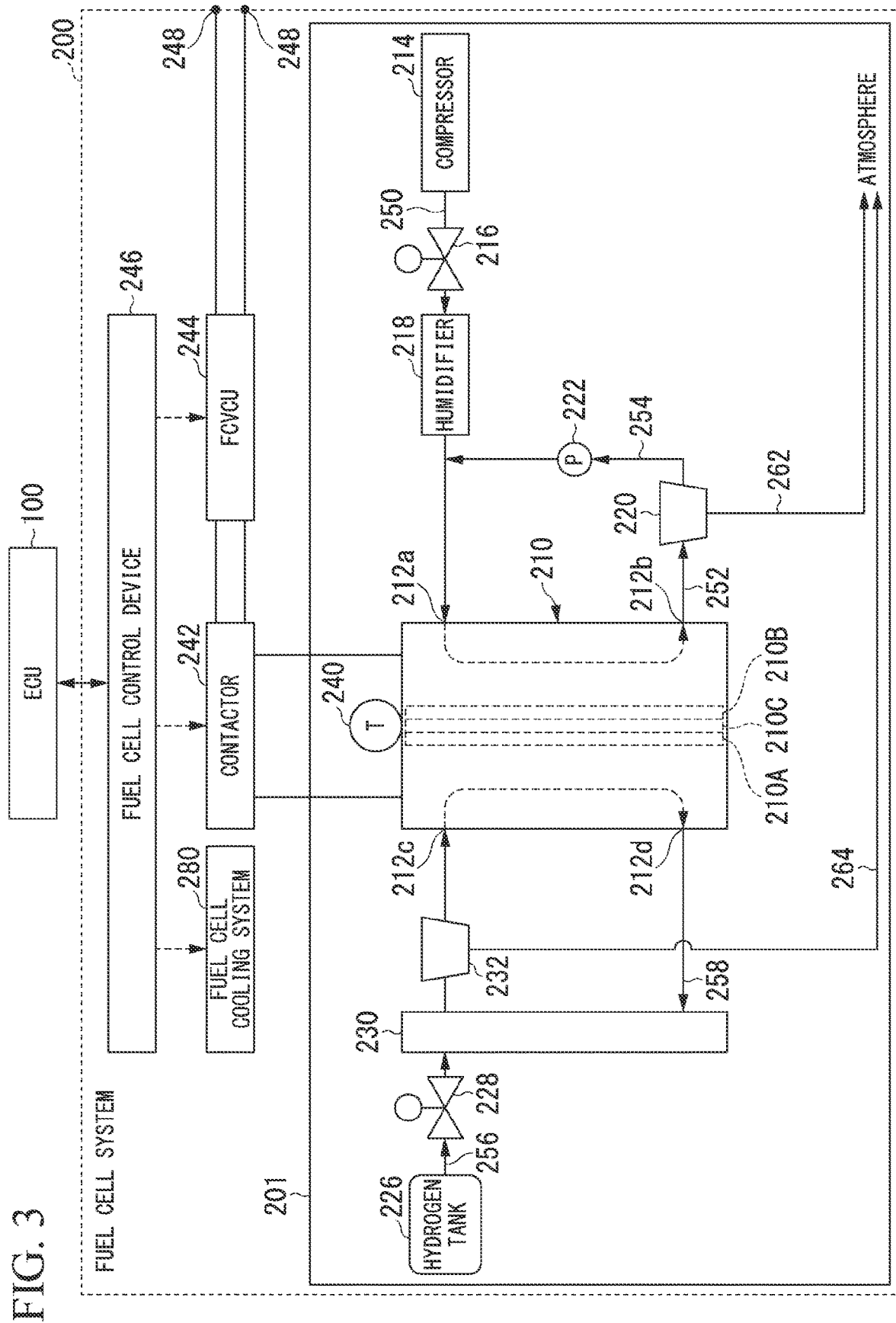
FIG. 3 is a diagram showing an example of a configuration of a fuel cell system according to the embodiment.

Here, an example of a configuration of the fuel cell system 200 will be described. FIG. 3 is a diagram showing the example of the configuration of the fuel cell system 200 according to the present embodiment. As shown in FIG. 3, the fuel cell system 200 includes, for example, a fuel cell stack 210, a compressor 214, a sealing inlet valve 216, a humidifier 218, a gas-liquid separator 220, an exhaust gas circulation pump (P) 222, a hydrogen tank 226, a hydrogen supply valve 228, a hydrogen circulation portion 230, a gas-liquid separator 232, a temperature sensor (T) 240, a contactor 242, an FCVCU 244, a fuel cell control device 246, and a fuel cell cooling system 280. The configuration of FIG. 3 is an example and the configuration of the fuel cell system 200 is not limited thereto.

The compressor 214 includes a motor and the like that are driven and controlled by the fuel cell control device 246 and pumps an oxidant gas to the fuel cell by taking in and compressing air from the outside using the driving force of the motor and feeding the compressed air to the oxidant gas supply path 250 connected to the cathode 210B.

The sealing inlet valve 216 is provided in the oxidant gas supply path 250, which connects the compressor 214 and a cathode supply port 212a capable of supplying air to the cathode 210B of the fuel cell stack 210 and is opened and closed according to control of the fuel cell control device 246.

The humidifier 218 humidifies the air fed from the compressor 214 to the oxidant gas supply path 250. For example, the humidifier 218 includes a water-permeable membrane such as a hollow fiber membrane and adds moisture to the air by causing the air from the compressor 214 to be brought into contact with the moisture via the water permeable membrane, thereby humidifying the air.

The gas-liquid separator 220 causes a cathode exhaust gas, which is not consumed by the cathode 210B and is expelled from a cathode discharge port 212b to an oxidant gas discharge path 252, and the liquid water to be expelled into the atmosphere via the cathode exhaust path 262. The gas-liquid separator 220 may separate the cathode exhaust gas expelled to the oxidant gas discharge path 252 from the liquid water and only the separated cathode exhaust gas may be allowed to flow into an exhaust gas recirculation path 254.

The exhaust gas circulation pump 222 is provided in the exhaust gas recirculation path 254, mixes the cathode exhaust gas that has flowed from the gas-liquid separator 220 to the exhaust gas recirculation path 254 with the air flowing through the oxidant gas supply path 250 from the sealing inlet valve 216 to the cathode supply port 212a, and supplies a mix of the cathode exhaust gas and the air to the cathode 210B again.

The hydrogen tank 226 stores hydrogen in a compressed state. The hydrogen supply valve 228 is provided in a fuel gas supply path 256 that connects the hydrogen tank 226 and an anode supply port 212c capable of supplying hydrogen to the anode 210A of the fuel cell stack 210. When the hydrogen supply valve 228 is opened according to the control of the fuel cell control device 246, the hydrogen stored in the hydrogen tank 226 is supplied to the fuel gas supply path 256.

The hydrogen circulation portion 230 is, for example, a pump that circulates and supplies a fuel gas to the fuel cell 201. For example, the hydrogen circulation portion 230 causes the anode exhaust gas, which is not consumed by the anode 210A and is expelled from an anode discharge port 212d to a fuel gas discharge path 258, to circulate to the fuel gas supply path 256 flowing into the gas-liquid separator 232.

The gas-liquid separator 232 separates the anode exhaust gas and the liquid water that circulate from the fuel gas discharge path 258 to the fuel gas supply path 256 according to the action of the hydrogen circulation portion 230. The gas-liquid separator 232 supplies the anode exhaust gas separated from the liquid water to the anode supply port 212c of the fuel cell stack 210. The liquid water expelled to the gas-liquid separator 232 is expelled into the atmosphere via a drain pipe 264.

The temperature sensor 240 detects temperatures of the anode 210A and the cathode 210B of the fuel cell stack 210 and outputs a detection signal (temperature information) to the fuel cell control device 246.

The contactor 242 is provided between the anode 210A and the cathode 210B of the fuel cell stack 210 and the FCVCU 244. The contactor 242 electrically connects or disconnects the fuel cell stack 210 and the FCVCU 244 on the basis of the control from the fuel cell control device 246.

The FCVCU 244 is disposed between the anode 210A and the cathode 210B of the fuel cell stack 210 and an electrical load via the contactor 242. The FCVCU 244 boosts the voltage of an output terminal 248 connected to the electric load side to a target voltage determined by the fuel cell control device 246. For example, the FCVCU 244 boosts the voltage output from the fuel cell stack 210 to the target voltage and outputs the boosted voltage to the output terminal 248.

The fuel cell control device 246 controls the start and end of power generation in the fuel cell system 200, the amount of power to be generated, and the like according to the power generation control by the ECU 100. The fuel cell control device 246 controls the temperature adjustment of the fuel cell system 200 using the fuel cell cooling system 280. For example, the fuel cell control device 246 may be replaced with a control device such as a fuel cell (FC)-ECU. Also, the fuel cell control device 246 may perform power generation control of the electric vehicle 1 in cooperation with the ECU 100.

The fuel cell cooling system 280 cools the fuel cell system 200 according to the control by the fuel cell control device 246, for example, when the temperature of the fuel cell stack 210 detected by the temperature sensor 240 is greater than or equal to a prescribed threshold value. For example, the fuel cell cooling system 280 decreases the temperature of the fuel cell stack 210 by circulating a refrigerant to the flow path provided within the fuel cell stack 210 and expelling the heat of the fuel cell stack 210. The fuel cell cooling system 280 may perform control for heating or cooling the fuel cell stack 210 so that the temperature from the temperature sensor 240 is maintained in a prescribed temperature range when the fuel cell system 200 is generating electric power.

[Control Device]

Figure 4:
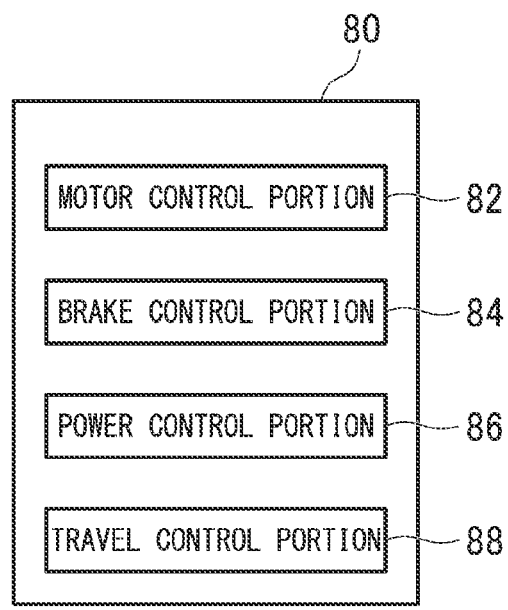
FIG. 4 is a block diagram showing an example of a configuration of a control portion according to the embodiment.

Next, an example of a configuration of the control portion 80 when the units 4A and 4B include the control portions 80 (80A and 80B) will be described. FIG. 4 is a block diagram showing an example of the configuration of the control portion 80 according to the present embodiment. The control portion 80 includes, for example, a motor control portion 82, a brake control portion 84, a power control portion 86, and a travel control portion 88. When the control portion 80 is not provided, the ECU 100 performs the following control.

The motor control portion 82 calculates a driving force required for the motor 12 on the basis of an output of the vehicle sensor 461 and controls the motor 12 so that the motor 12 outputs the calculated driving force.

The brake control portion 84 calculates a braking force required for the brake device 462 on the basis of an output of the vehicle sensor 461 and controls the brake device 462 so that the brake device 462 outputs the calculated braking force.

The power control portion 86 manages a charged state (a stored state) of the battery 40. For example, the power control portion 86 calculates a state of charge (SOC) (a battery charge rate) of the battery 40 on the basis of the output of the battery sensor provided in the battery 40. For example, when the SOC of the battery 40 is less than a prescribed value, the power control portion 86 executes control for charging the battery 40 according to power generation by the fuel cell system 200 or causes a notification of information for prompting an occupant to charge the battery 40 with electric power supplied from an external charging facility to be provided. The power control portion 86 may stop the charging control when the SOC of the battery 40 is greater than a prescribed value or may perform control for causing auxiliary equipment or the like to consume the surplus power generated by the fuel cell system 200.

The travel control portion 88 executes a driving control process on the electric vehicle 1 on the basis of the information acquired by, for example, the vehicle sensor 461. The travel control portion 88 may execute the driving control process on the electric vehicle 1 on the basis of map information and information acquired from a monitoring unit (not shown) in addition to the information acquired by the vehicle sensor 461. The monitoring unit includes, for example, a camera that images a space outside the electric vehicle 1, a radar or a light detection and ranging (LIDAR) sensor that has a detection range outside the electric vehicle 1, a physical object recognition device that performs a sensor fusion process on the basis of outputs thereof, and the like. The monitoring unit estimates types of physical objects (particularly, vehicles, pedestrians, and bicycles) near the electric vehicle 1 and outputs a result of estimating the types of physical objects to the travel control portion 88 together with information of positions and speeds thereof. For example, the driving control process is a process of causing the electric vehicle 1 to travel by controlling one or both of steering or acceleration/deceleration of the electric vehicle 1.

[ECU]

Figure 5:
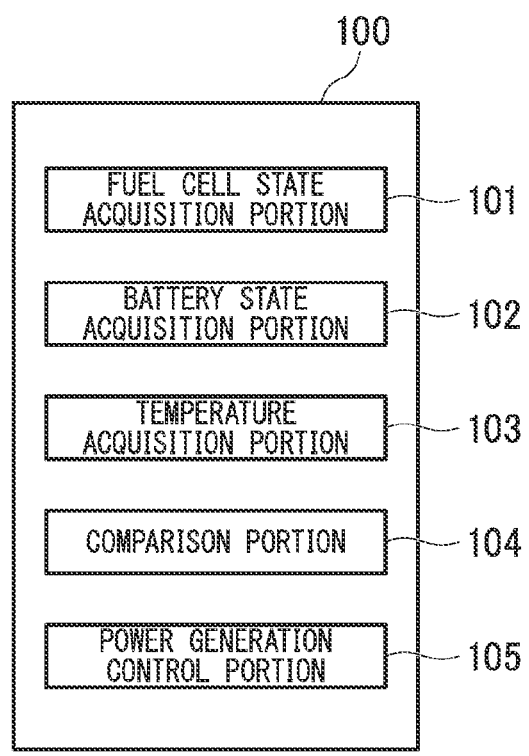
FIG. 5 is a block diagram showing an example of a configuration of an electronic control unit (ECU) according to the embodiment.

Next, an example of a configuration of the ECU 100 will be described. FIG. 5 is a block diagram showing the example of the configuration of the ECU 100 according to the present embodiment. As shown in FIG. 5, the ECU 100 includes a fuel cell state acquisition portion 101, a battery state acquisition portion 102, a temperature acquisition portion 103, a comparison portion 104, and a power generation control portion 105.

The fuel cell state acquisition portion 101 acquires information about a state of each fuel cell system 200.

The battery state acquisition portion 102 acquires information about a state of the battery 40.

The temperature acquisition portion 103 acquires information about a temperature of the fuel cell system 200.

The comparison portion 104 compares a calculated SOC with a threshold value stored in the storage portion 150. The comparison portion 104 compares the calculated required power with the threshold value stored in the storage portion 150. The comparison portion 104 compares the temperature with a threshold value stored in the storage portion 150.

The power generation control portion 105 calculates a required amount of power to be provided by the battery 40 and the fuel cell system 200 on the basis of an output of the vehicle sensor 461. For example, the power generation control portion 105 calculates a torque to be output by the motor 12 on the basis of an accelerator opening degree and a vehicle speed and calculates the required amount of power by obtaining a sum of drive shaft load power obtained from the torque and a rotational speed of the motor 12 and electric power required for the auxiliary equipment 46 and the like. For example, the power control portion 86 calculates the SOC of the battery 40 on the basis of the output of the battery sensor provided in the battery 40. The power generation control portion 105 may be configured to acquire SOC information from the control portion 80. The power generation control portion 105 controls each of the plurality of fuel cell systems 200 so that the fuel cell system 200 is in an ON state or an OFF state on the basis of a comparison result of the comparison portion 104. The control portion 80 may perform a part of the process that is performed by the power generation control portion 105.

First Control Example

Figure 6:
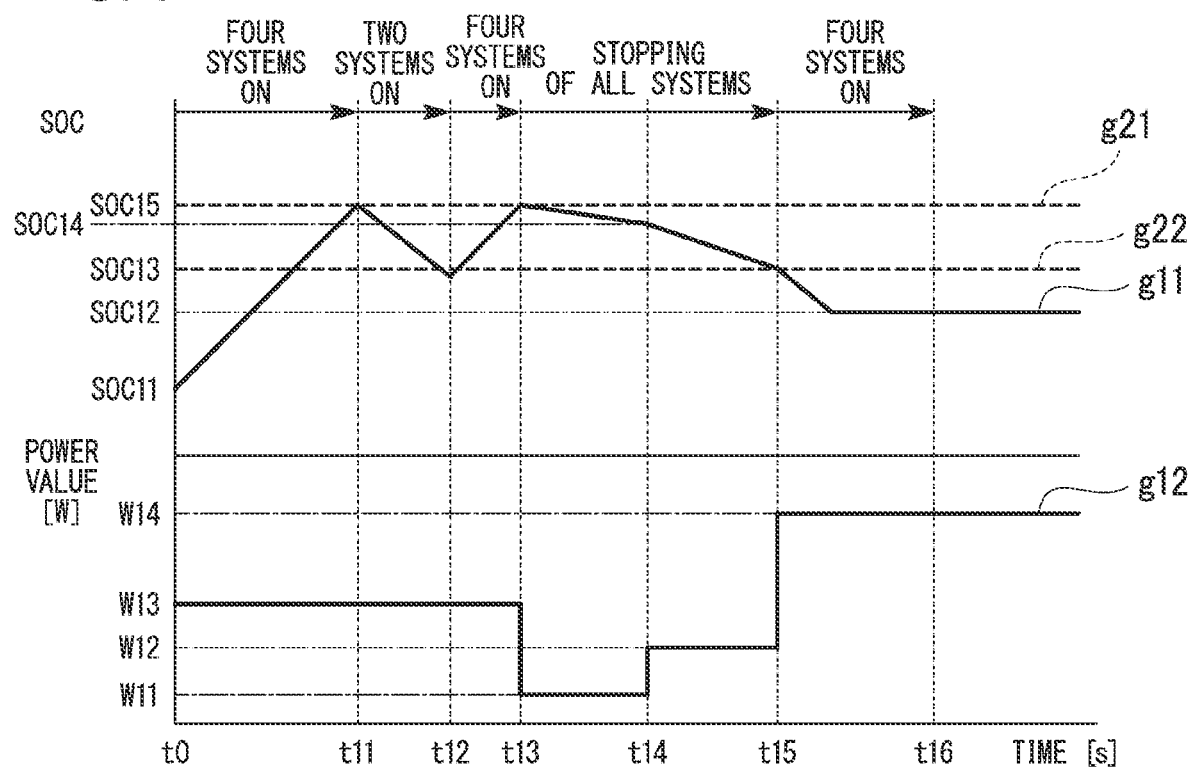
FIG. 6 is a diagram showing an example of changes in required system power and a state of charge (SOC) of a battery over time in a first control example according to the embodiment.

Next, a first control example will be described. In the first control, when the electric vehicle 1 is in an idling state, the ECU 100 controls each of the plurality of fuel cell systems in accordance with the SOC. FIG. 6 is a diagram showing an example of changes in required system power and an SOC of the battery over time in the first control example according to the present embodiment. In FIG. 6, the horizontal axis represents time [s]. The vertical axis for a line g11 represents an SOC value and represents a change in the SOC of the battery with respect to time. The vertical axis may be a voltage value [V]. The vertical axis for a line g12 represents a power value [W] and represents a change in required system power with respect to time. A broken line g21 indicates a first threshold value (SOC15) and a broken line g22 indicates a second threshold value (SOC13). The first threshold value is a power generation stop execution threshold value and the second threshold value is a power generation stop release threshold value. A magnitude relationship of required power is W11<W12<W13<W14. A magnitude relationship of SOCs is SOC11<SOC12<SOC13<SOC14<SOC15.

For a period from time t0 to time t11, electric power that is generated by the plurality of fuel cell systems 200 is lower than the electric power that is consumed by the load of the electric vehicle 1, so that the SOC of the battery 40 rises from SOC11 to SOC15. The required power for the above period is W13. Because the SOC is less than or equal to the first threshold value (g21), the ECU 100 controls all four fuel cell systems 200 (200A, 200B, 200C, and 200D) so that they are in the ON state (an operating state).

For a period from time t11 to time t12, because the SOC has reached the first threshold value, the battery 40 cannot be charged. Therefore, the ECU 100 performs control for stopping the load. Further, because the required power remains W13, the ECU 100 performs control so that two fuel systems among the four fuel cell systems 200 are in the OFF state (a stopped state) and the other two fuel systems are in the ON state. Although an example in which two fuel cell systems 200 are stopped will be described in the present example, it is only necessary for the number of fuel cell systems 200, which are stopped, to be one or more. According to the above control, the SOC is lowered from SOC15 to SOC13.

For a period from time t12 to time t13, because the SOC becomes the second threshold value and the required power remains W13, the ECU 100 performs control so that the four fuel cell systems 200 are all in the ON state by setting the two fuel cell systems 200, which have been stopped, to the ON state. According to the above control, the SOC is raised from SOC13 to SOC15.

At time t13, the load decreases and the required power decreases from W13 to W11. For a period from time t13 to time t14, because the required power has decreased, the ECU 100 performs control so that all four fuel cell systems 200 are in the OFF state. According to the above control, the SOC is lowered from SOC15 to SOC14.

For a period from time t14 to time t15, the load changes and the required power increases from W11 to W12, which is less than W13 and greater than W11, but the ECU 100 continues control for setting all four fuel cell systems 200 to the OFF state because the SOC is greater than or equal to the second threshold value. According to the above control, the SOC is lowered from SOC14 to SOC13.

At time t15, the required power increases from W12 to W14, which is greater than W13. For a period from time t15 to time t16, because the required power has increased, the ECU 100 performs control so that the four fuel cell systems 200 are all in the ON state. According to the above control, the SOC is lowered from SOC13 to SOC12.

In this way, the ECU 100 performs control so that one or more fuel cell systems 200 are in the OFF state after the SOC reaches the first threshold value. The ECU 100 allows the OFF state of the fuel cell system 200 to continue when the SOC is less than or equal to the first threshold value and greater than or equal to the second threshold value. The first threshold value and the second threshold value have hysteresis. When the SOC becomes less than the second threshold value, the ECU 100 performs control so that all fuel cell systems 200 are in the ON state. There is a prescribed power generation area between the first threshold value and the second threshold value.

Figure 7:
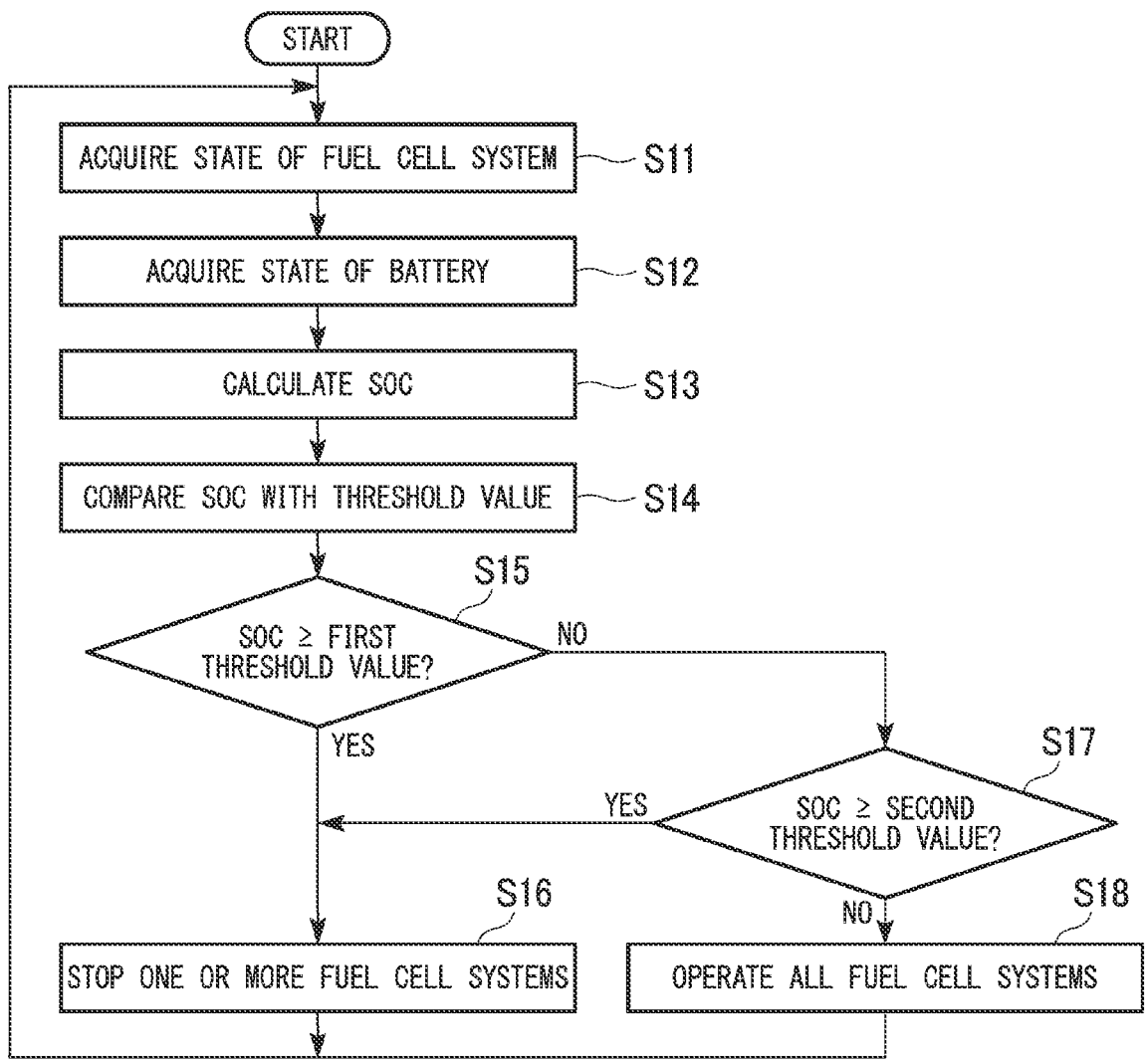
FIG. 7 is a flowchart showing an example of a processing procedure of the ECU in the first control example of the embodiment.

Next, an example of a processing procedure of the ECU 100 will be described. FIG. 7 is a flowchart showing the example of the processing procedure of the ECU 100 in the first control example of the present embodiment. It is assumed that the four fuel cell systems 200 are in operation (in the ON state) at the start of processing.

The fuel cell state acquisition portion 101 acquires information about the state of each fuel cell system 200 (step S11). The battery state acquisition portion 102 acquires information about the battery 40 (step S12).

The power generation control portion 105 calculates the SOC of the battery 40 on the basis of an output of the battery sensor provided in the battery 40 (step S13).

The comparison portion 104 compares the calculated SOC with the first threshold value and the second threshold value stored in the storage portion 150 (step S14). The power generation control portion 105 determines whether or not a comparison result of the comparison portion 104 indicates that the SOC is greater than or equal to the first threshold value (step S15).

When it is determined that the SOC is less than the first threshold value (step S15; NO), the power generation control portion 105 determines whether or not the SOC is greater than or equal to the second threshold value (step S17). When it is determined that the SOC is greater than or equal to the second threshold value (step S17; YES), the power generation control portion 105 proceeds to the processing of step S16.

When it is determined that the SOC is greater than or equal to the first threshold value (step S15; YES) or when it is determined that the SOC is greater than or equal to the second threshold value (step S17; YES), the power generation control portion 105 performs control so that one or more fuel cell systems 200 are stopped (an OFF state) (step S16). After the above processing, the power generation control portion 105 returns to the processing of step S11.

When it is determined that the SOC is less than the second threshold value (step S17; NO), the power generation control portion 105 causes all fuel cell systems 200 to be operated (an ON state) (step S18). After the above processing, the power generation control portion 105 returns the processing to step S11.

In the process of FIG. 7, the ECU 100 may be configured to maintain or change the control state of the fuel cell system 200 on the basis of an increase or a decrease in the required power as shown in FIG. 6. That is, the ECU 100 may be configured to select the fuel cell system to be operated from among the plurality of fuel cell systems on the basis of both the required power and the state of the battery 40. In this case, for example, the ECU 100 may calculate a score based on the required power and the state of the battery 40 and select a fuel cell system to be operated from among the plurality of fuel cell systems on the basis of the calculated score.

Second Control Example

Figure 8:
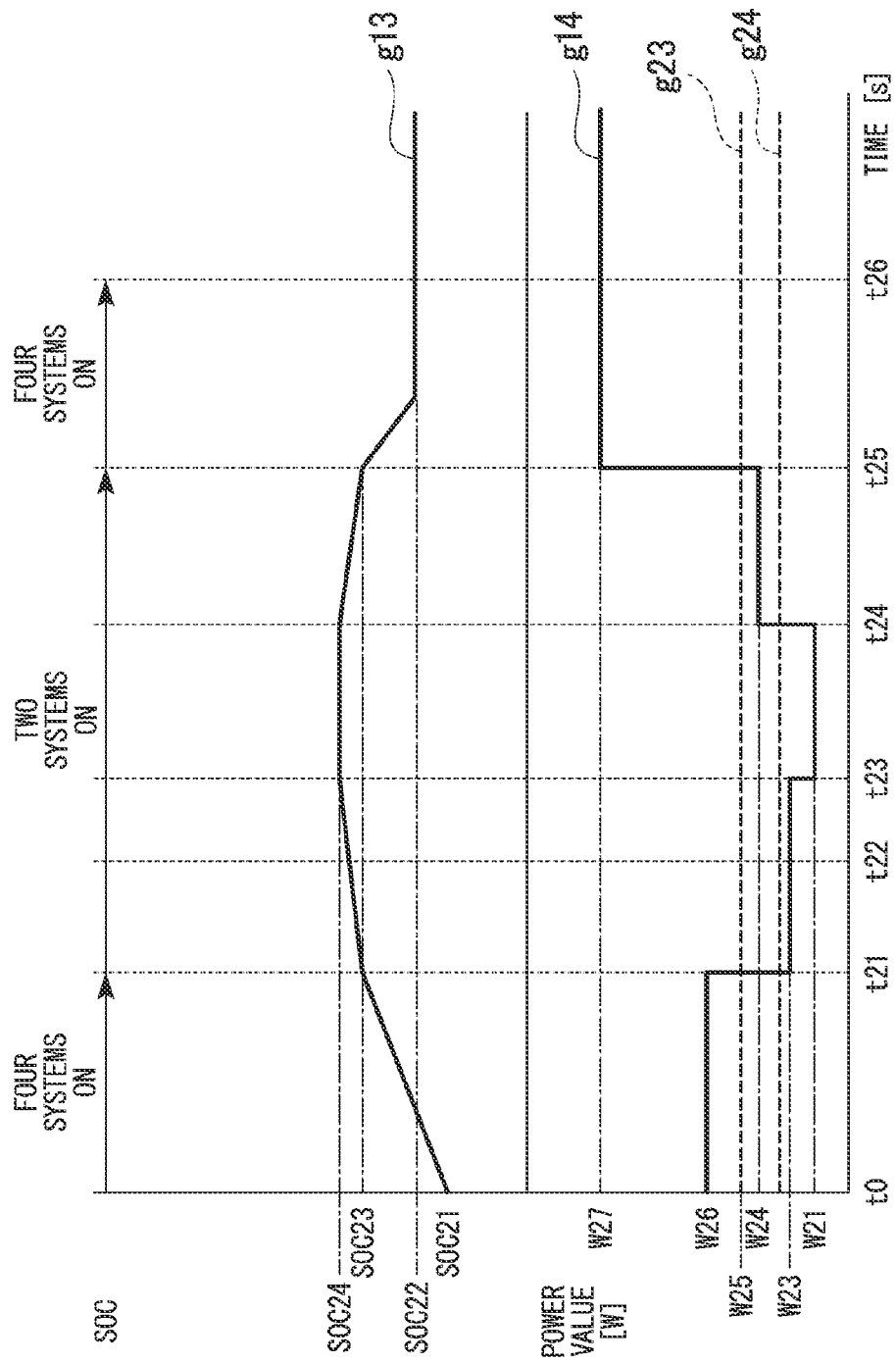
FIG. 8 is a diagram showing an example of changes in required system power and an SOC of a battery over time in a second control example according to the embodiment.

Next, a second control example will be described. In the second control, for example, when the electric vehicle 1 is in an idling state, the ECU 100 controls each of the plurality of fuel cell systems in accordance with required power. FIG. 8 is a diagram showing an example of changes in required system power and an SOC of a battery over time in the second control example according to the present embodiment. In FIG. 8, the horizontal axis represents time [s]. The vertical axis for a line g13 represents an SOC and represents a change in an SOC of a battery with respect to time. The vertical axis may represent a voltage value [V]. The vertical axis for a line g14 represents a power value [W] and represents a change in required system power with respect to time. A broken line g23 indicates a third threshold value (W25) and a broken line g24 indicates a fourth threshold value (W23). The third threshold value is a power generation stop release threshold value and the fourth threshold value is a power generation stop execution threshold value. A magnitude relationship of required power is W21<W22<W23<W24<W25<W26<W27. A magnitude relationship of SOCs is SOC21<SOC22<SOC23<SOC24.

For a period from time t0 to time t21, electric power that is generated by the plurality of fuel cell systems 200 is lower than electric power that is consumed by the load of the electric vehicle 1, so that the SOC of the battery 40 rises from SOC21 to SOC23. The required power for the above period is W26. Because the required power is greater than or equal to the third threshold value (g23), the ECU 100 controls all four fuel cell systems 200 so that they are in the ON state (the operating state).

At time t21, the required power decreases from W26 to W23, which is less than W26. For a period from time t21 to time t23, because the required power is less than the fourth threshold value (g24), the ECU 100 performs control so that two fuel systems among the four fuel cell systems 200 are in the OFF state (the stopped state) and the other two fuel systems are in the ON state. Although an example in which two fuel cell systems 200 are stopped will be described in the present example, it is only necessary for the number of fuel cell systems 200, which are stopped, to be one or more. According to the above control, the SOC is raised from SOC23 to SOC24.

At time t23, the required power decreases from W23 to W21, which is less than W23. For a period from time t23 to time t24, because the required power is less than the fourth threshold value (g24), the ECU 100 continues a state of control so that two fuel systems among the four fuel cell systems 200 are in the OFF state (the stopped state) and the other two fuel systems are in the ON state. According to the above control, the SOC remains SOC24.

At time t24, the required power increases from W21 to W24, which is less than W26 and greater than W23. For a period from time t24 to time t25, because the required power is greater than or equal to the fourth threshold value (g24) and less than or equal to the third threshold value, the ECU 100 continues a state of control so that two fuel systems among the four fuel cell systems 200 are in the OFF state (the stopped state) and the other two fuel systems are in the ON state. According to the above control, the SOC is lowered from SOC24 to SOC23.

At time t25, the required power increases from W24 to W27, which is greater than W26. For a period from time t25 to time t26, because the required power is greater than the third threshold value (g23), the ECU 100 performs control so that all four fuel cell systems 200 are in the ON state. According to the above control, the SOC is lowered from SOC23 to SOC22.

In this way, the ECU 100 performs control so that one or more fuel cell systems 200 is in the OFF state when the required power becomes less than or equal to the third threshold value. The ECU 100 allows the OFF state of the fuel cell system 200 to continue when a required amount of power is less than or equal to the third threshold value and greater than or equal to the fourth threshold value. The third threshold value and the fourth threshold value have hysteresis. When the required power becomes less than the fourth threshold value, the ECU 100 performs control so that all fuel cell systems 200 are in the ON state. There is a prescribed power generation area between the third threshold value and the fourth threshold value.

Figure 9:
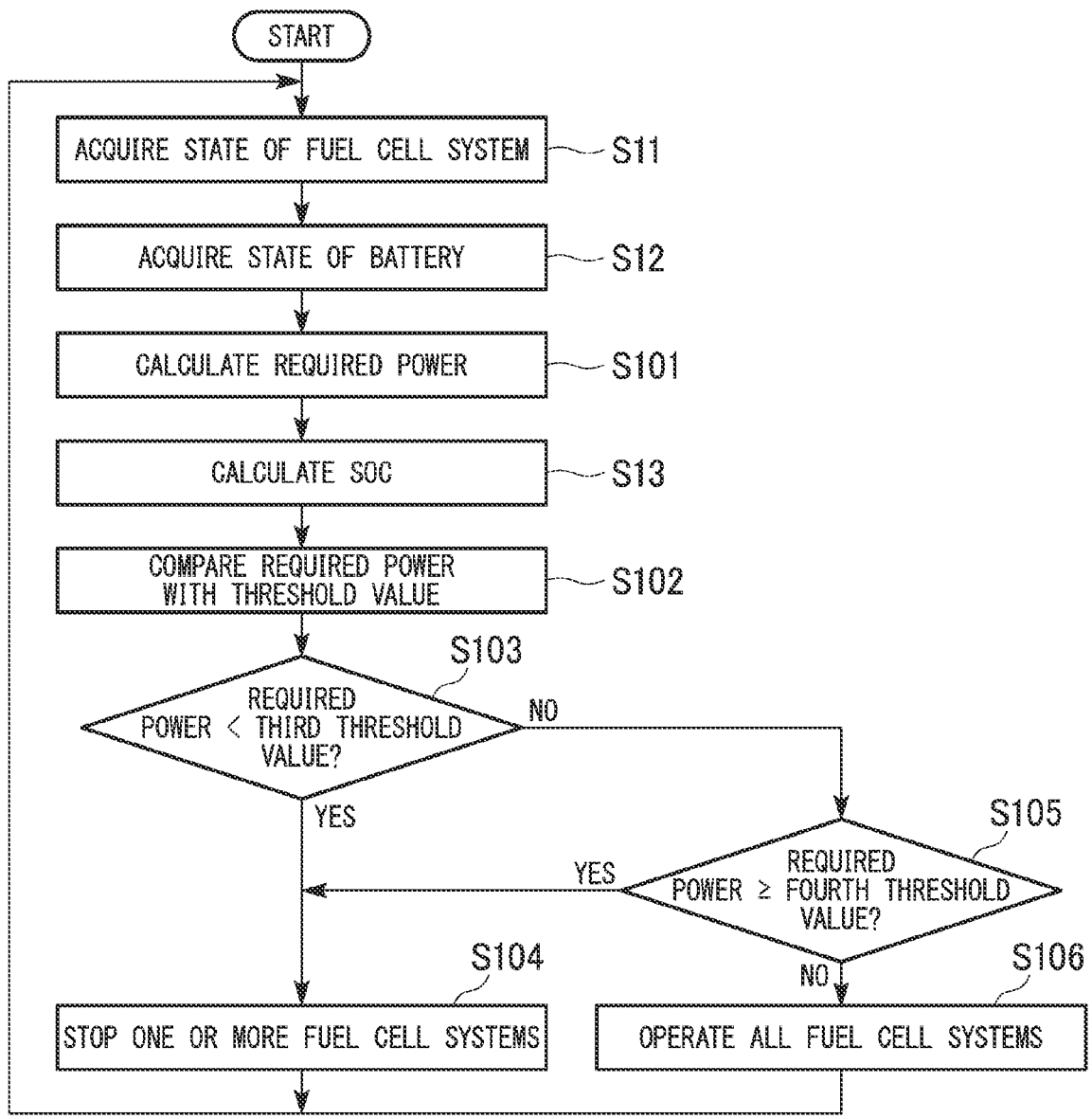
FIG. 9 is a flowchart showing an example of a processing procedure of the ECU in the second control example of the embodiment.

Next, an example of the processing procedure of the ECU 100 will be described. FIG. 9 is a flowchart showing the example of the processing procedure of the ECU 100 in the second control example of the present embodiment. It is assumed that the four fuel cell systems 200 are in operation (in the ON state) at the start of processing. The same reference signs are used for the processing steps similar to those of the first control, and the description thereof will be omitted.

The ECU 100 performs the processing of steps S11 and S12.

The power generation control portion 105 calculates a required amount of power to be provided by the battery 40 and the fuel cell system 200 on the basis of an output of the vehicle sensor 461 (step S101). The power generation control portion 105 calculates an SOC of the battery 40 on the basis of an output of the battery sensor provided in the battery 40 (step S13).

The comparison portion 104 compares the calculated required power with the third threshold value and the fourth threshold value stored in the storage portion 150 (step S102). The power generation control portion 105 determines whether or not a comparison result of the comparison portion 104 indicates that the required power is less than the third threshold value (step S103).

When it is determined that the required power is greater than or equal to the third threshold value (step S103; NO), the power generation control portion 105 determines whether or not a comparison result of the comparison portion 104 indicates that the required power is greater than or equal to the fourth threshold value (step S105). When it is determined that the required power is greater than or equal to the fourth threshold value (step S105; YES), the power generation control portion 105 proceeds to the processing of step S104.

When it is determined that the required power is less than the third threshold value (step S103; YES) or when it is determined that the required power is greater than or equal to the fourth threshold value (step S105; YES), the power generation control portion 105 performs control so that one or more fuel cell systems 200 are stopped (the OFF state) (step S104). The power generation control portion 105 returns to the processing of step S11.

When it is determined that the required power is less than the fourth threshold value (step S105; NO), the power generation control portion 105 causes all fuel cell systems 200 to be operated (the ON state) (step S106). After the above processing, the power generation control portion 105 returns the processing to step S11.

Also, in the process of FIG. 9, the ECU 100 may select the fuel cell system to be operated from among the plurality of fuel cell systems on the basis of both the required power and the state of the battery 40. In this case, for example, the ECU 100 may calculate a score based on the required power and the state of the battery 40 and select the fuel cell system to be operated from among the plurality of fuel cell systems on the basis of the calculated score.

First Modified Example

Here, a first modified example will be described. In the first control and the second control, an example in which two of the four fuel cell systems 200 are set to the OFF state when a prescribed condition is satisfied has been described. In the first modified example, an example of a method of setting the fuel cell system 200 to the ON state or the OFF state on the basis of a power generation time period will be described.

Figure 10:
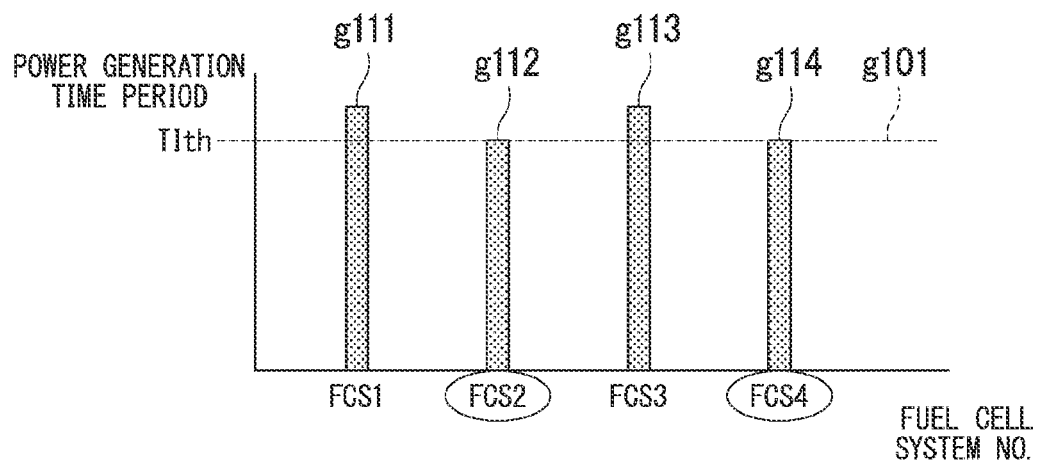
FIG. 10 is a diagram for describing a first modified example.

For a period from time t21 to time t25 in FIG. 8, the ECU 100 may be configured to randomly select two of the four systems, select the two systems in order, or select the two systems in descending order of power generation time period as shown in FIG. 10. FIG. 10 is a diagram for describing the first modified example. In FIG. 10, the horizontal axis represents a fuel cell system number and the vertical axis represents a power generation time period [(for example, minutes)]. A broken line g101 indicates a fifth threshold value (Tlth) with respect to the power generation time period. Reference sign gill denotes a power generation time period of the first fuel cell system 200A, reference sign g112 denotes a power generation time period of the second fuel cell system 200B, reference sign g113 denotes a power generation time period of the third fuel cell system 200C, and reference sign g114 denotes a power generation time period of the fourth fuel cell system 200D.

In the example of FIG. 10, the first fuel cell system 200A and the third fuel cell system 200C have power generation time periods greater than or equal to the fifth threshold value and the second fuel cell system 200B and the fourth fuel cell system 200D have power generation time periods less than the fifth threshold value. The fifth threshold value may be obtained by, for example, averaging the power generation time periods of the plurality of fuel cell systems in the power generation control portion 105, or may be a predetermined value. In this case, for a period from time t21 to time t25, the ECU 100 performs control so that the first fuel cell system 200A and the third fuel cell system 200C whose power generation time periods are greater than or equal to the fifth threshold value are stopped and the second fuel cell system 200B and the fourth fuel cell system 200D whose power generation time periods are less than the fifth threshold value are operated.

Although the example in which the power generation control portion 105 selects the fuel cell system 200 to be stopped or operated in comparison with the fifth threshold value has been described in the above-described example, the present invention is not limited thereto. The power generation control portion 105 may be configured to sort the power generation time periods of the plurality of fuel cell systems 200 in descending order or in ascending order to select the fuel cell system 200 to be stopped in descending order of power generation time period or to select the fuel cell system 200 to be operated in ascending order of power generation time period. The power generation control portion 105 may be configured to select the fuel cell system 200 to be operated or the fuel cell system 200 to be stopped on the basis of a result of comparing the power generation time period with the threshold value.

Here, an example of the processing procedure of the ECU 100 will be described with reference to FIG. 9. In FIG. 9, a different processing step is step S103.

The power generation control portion 105 selects the fuel cell system 200 to be stopped on the basis of the power generation time period (step S103). The power generation control portion 105 also calculates the fifth threshold value and compares the power generation time period with the fifth threshold value in, for example, step S103.

Although an example of applying the first modified example to the second control has been described in the above-described example, it is possible to apply the first modified example to the first control.

Second Modified Example

Next, a second modified example will be described. In the first control and the second control, an example in which two of the four fuel cell systems 200 are set to the OFF state when a prescribed condition is satisfied has been described. In the second modified example, an example of a method of setting the fuel cell system 200 to the ON state or the OFF state on the basis of temperature information of the fuel cell system 200 will be described.

Figure 11:
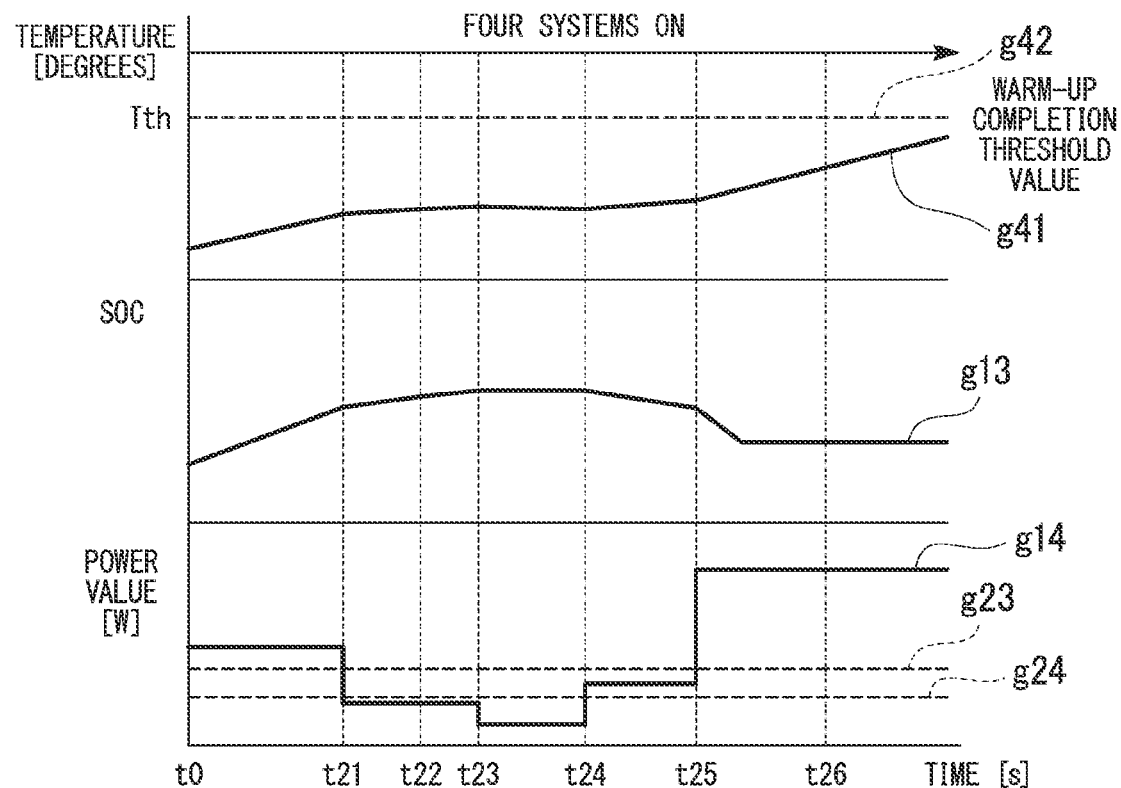
FIG. 11 is a diagram for describing a second modified example.

The ECU 100 may be configured to perform selection on the basis of a result of comparing a temperature with the threshold value. FIG. 11 is a diagram for describing the second modified example. In FIG. 11, the horizontal axis represents time [s]. The vertical axis for a line g13 represents an SOC and represents a change in an SOC of a battery with respect to time. The vertical axis for the line g13 may be a voltage value [V]. The vertical axis for a line g14 represents a power value [W] and represents a change in required system power with respect to time. The vertical axis for a broken line g41 represents a temperature [degrees] and represents a change in the temperature of the fuel cell system 200 with respect to time. The broken line g42 indicates a sixth threshold value (Tth).

The temperature of the fuel cell system 200 is, for example, a temperature detected by the temperature sensor 240 (FIG. 3). The sixth threshold value is a warm-up completion threshold value (a temperature threshold value) for causing the operation of the fuel cell system 200 to be completed.

A change between a line g14 of the required power and a line g13 of the SOC is the same as that of FIG. 8 in the example of FIG. 11, the power generation control portion 105 does not cause the operation of the fuel cell system 200 to be stopped because a temperature for a period from time t0 to time t26 is less than the sixth threshold value. When the temperature becomes greater than or equal to the sixth threshold value after time t26, the operation of at least one fuel cell system 200 is stopped.

The temperature shown in FIG. 11 is, for example, an average of temperatures of the four fuel cell systems 200. The temperature may be a temperature specific to each fuel cell system 200. In this case, the power generation control portion 105 may cause the operation of the fuel cell system 200 whose temperature is greater than or equal to the sixth threshold value to be stopped for a period from time t21 to time t25. Alternatively, for the period from time t21 to t25, the power generation control portion 105 may be configured to cause the operations of two of the fuel cell systems 200 whose temperatures are greater than or equal to the sixth threshold value to be stopped in descending order of temperature.

Figure 12:
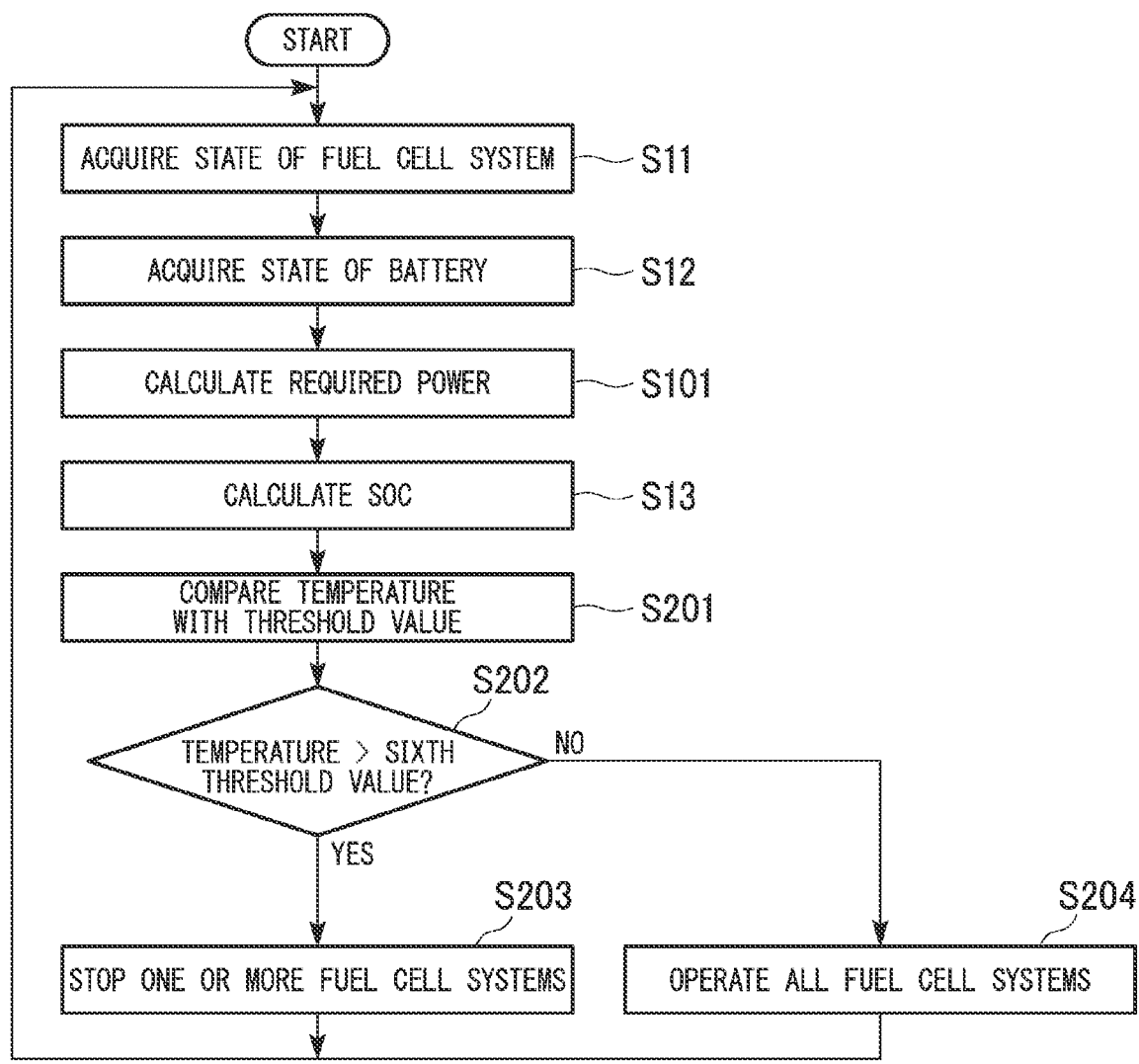
FIG. 12 is a flowchart showing an example of a processing procedure of the ECU in the second modified example of the embodiment.

Next, an example of the processing procedure of the ECU 100 will be described. FIG. 12 is a flowchart showing the example of the processing procedure of the ECU 100 in the second modified example of the present embodiment. It is assumed that the four fuel cell systems 200 are in operation (in the ON state) at the start of processing. The same reference signs are used for the processing steps similar to those of the first control and the description thereof will be omitted.

The ECU 100 performs the processing of steps S11 to S12, S101, and S13.

The comparison portion 104 calculates, for example, an average value of temperatures detected by the temperature sensors 240 of the plurality of fuel cell systems 200. The comparison portion 104 compares the average value of the temperatures with the sixth threshold value stored in the storage portion 150 (step S201). The power generation control portion 105 determines whether or not a comparison result of the comparison portion 104 indicates that the average value of the temperatures is greater than the sixth threshold value (step S202).

When it is determined that the average value of the temperatures is greater than the sixth threshold value (step S202; YES), the power generation control portion 105 performs control so that one or more fuel cell systems 200 are stopped (the OFF state) (step S203). After the above processing, the power generation control portion 105 returns the processing to step S11.

When it is determined that the average value of the temperatures is not greater than or equal to the sixth threshold value (step S202; NO), the power generation control portion 105 performs control so that all fuel cell systems 200 are in the operating state (step S204). After the above processing, the power generation control portion 105 returns the processing to step S11. Although the average value of the temperatures is compared with the threshold value for the determination in the above, it is also possible to make a determination on the basis of a minimum value or a maximum value of the temperature or the like in accordance with characteristics of the system.

The second modified example can be applied to the first control and the second control.

The present invention is not limited to the first modified example and the second modified example described above. The ECU 100 may be configured to select a fuel cell system 200 to be stopped in accordance with an operating time period and wetness of a fuel cell system 200, a history of a previously stopped fuel cell system 200, a time period of use of an ion exchange device, deterioration in the fuel cell 201, or the like.

In the first control and the second control, the ECU 100 may be configured to perform control so that the stopping of power generation is not released immediately even if the required system power becomes greater than or equal to minimum generation power when the SOC of the battery is high. This is because electric power is supplemented by the battery 40 until a prescribed SOC (a seventh threshold value Soth) is reached, and the SOC of the battery 40 is reduced. The seventh threshold value Soth is a threshold value according to the battery 40, and is, for example, a value less than or equal to a standard value and greater than the first threshold value. When the above process is performed, the ECU 100 may be configured to compare the SOC with a prescribed value of the SOC stored in the storage portion 150, for example, in step S14 (FIG. 7) or S102 (FIG. 9). The ECU 100 may determine whether or not to stop the fuel cell system 200 in consideration of a result of making a comparison with the SOC in, for example, step S15 (FIG. 7) or S103 (FIG. 9).

[Example of Information Stored in Storage Portion 150]

Here, an example of information stored in the storage portion 150 will be described. FIG. 13 is a diagram showing the example of the information stored in the storage portion 150 according to the present embodiment. As shown in FIG. 13, the storage portion 150 stores the first threshold value and the second threshold value related to the SOC, the third threshold value and the fourth threshold value related to the required power, the fifth threshold value related to the power generation time period, the sixth threshold value related to the temperature, and the seventh threshold value related to the SOC (the charge rate).

The threshold values shown in FIG. 13 are an example and the storage portion 150 may store other threshold values.

According to the above-described embodiment, the power generation of the fuel cell system 200 can be stopped when the prescribed power generation area is reached. According to the above-described embodiment, the stopped state of the fuel cell system 200 can be changed according to the required power. According to the above-described embodiment, the power generation state of the fuel cell system 200 can be monitored by the ECU 100, and the power generation frequency of the fuel cell system 200 can be made uniform (an operating/non-operating stack can be determined). According to the above-described embodiment, it is possible to perform control so that the power generation is not stopped in a warm-up incompletion state (for example, when the system temperature is less than or equal to a prescribed value). According to the above-described embodiment, it is possible to cause the fuel cell system 200 to stop power generation when the required power is less than the minimum generation power (a high-potential power generation threshold value or the like). According to the above-described embodiment, the ECU 100 monitors wetness, an operating time period, deterioration, a temperature, a time period of use of an ion exchanger, a previous history, and the like in the fuel cell system 200 and the fuel cell system 200 whose power generation is stopped can be switched. According to the above-described embodiment, when the SOC of the battery 40 is high, it is possible to perform control so that the power generation stop is not immediately released when the required system power becomes greater than or equal to the minimum generation power.

As a result, according to the present embodiment, a power generation frequency (a usage time period, or the like) of the fuel cell system 200 that has been mounted can be made uniform, so that overall deterioration in the plurality of fuel cell systems can be limited. According to the present embodiment, the durability of the fuel cell system 200 and the components of the fuel cell system 200 can be improved.

Although modes for carrying out the present invention have been described above using the embodiments, the present invention is not limited to the embodiments and various modifications and replacements can be applied without departing from the spirit and scope of the present invention.

What is claimed is:

1. A power generation control system comprising:
a plurality of fuel cell systems mounted in an electric device that operates using electric power;
a battery mounted in the electric device; and
a control device configured to control each of the plurality of fuel cell systems on the basis of states of the plurality of fuel cell systems, a state of the battery, and required power of the plurality of fuel cell systems,
wherein the control device determines a fuel cell system to be operated among the plurality of fuel cell systems on the basis of a result of comparing the state of the battery with a threshold value, and
wherein the control device determines a fuel cell system to be stopped among the plurality of fuel cell systems when a result of comparing the state of the battery with the threshold value indicates that a state of charge (SOC), which is the state of the battery, is greater than or equal to the threshold value.

2. The power generation control system according to claim 1, wherein the control device determines a fuel cell system to be operated among the plurality of fuel cell systems on the basis of a result of comparing the required power with a threshold value.

3. The power generation control system according to claim 2, wherein the control device determines a fuel cell system to be stopped among the plurality of fuel cell systems when the result of comparing the required power with the threshold value indicates that the required power is less than the threshold value.

4. The power generation control system according to claim 1, wherein the control device determines a fuel cell system to be operated or stopped among the plurality of fuel cell systems on the basis of both the required power and the state of the battery.

5. The power generation control system according to claim 2, wherein the control device selects a fuel cell system to be operated from among the plurality of fuel cell systems on the basis of a result of comparing a power generation time period of each of the plurality of fuel cell systems with a threshold value.

6. The power generation control system according to claim 5, wherein the control device selects a fuel cell system to be stopped from among the plurality of fuel cell systems whose power generation time periods are greater than or equal to the threshold value indicated in the result of comparing the power generation time period of each of the plurality of fuel cell systems with the threshold value.

7. The power generation control system according to claim 2, wherein the control device selects a fuel cell system to be operated from among the plurality of fuel cell systems on the basis of a result of comparing temperatures of the plurality of fuel cell systems with a threshold value.

8. The power generation control system according to claim 7, wherein the control device selects a fuel cell system to be stopped from among the plurality of fuel cell systems when the result of comparing the temperatures of the plurality of fuel cell systems with the threshold value indicates that the temperature is greater than or equal to the threshold value.

9. The power generation control system according to claim 1, wherein the control device selects a fuel cell system to be operated or stopped from among the plurality of fuel cell systems on the basis of a result of comparing charge rates of fuel cells provided in the plurality of fuel cell systems with a threshold value.

10. A power generation control system comprising:
a plurality of fuel cell systems mounted in an electric device that operates using electric power;
a battery mounted in the electric device; and
a control device configured to control each of the plurality of fuel cell systems on the basis of states of the plurality of fuel cell systems, a state of the battery, and required power of the plurality of fuel cell systems,
wherein the control device determines a fuel cell system to be operated among the plurality of fuel cell systems on the basis of a result of comparing the required power with a threshold value, and
wherein the control device selects a fuel cell system to be operated from among the plurality of fuel cell systems on the basis of a result of comparing a power generation time period of each of the plurality of fuel cell systems with a threshold value.

11. A power generation control system comprising:
a plurality of fuel cell systems mounted in an electric device that operates using electric power;
a battery mounted in the electric device; and
a control device configured to control each of the plurality of fuel cell systems on the basis of states of the plurality of fuel cell systems, a state of the battery, and required power of the plurality of fuel cell systems,
wherein the control device determines a fuel cell system to be operated among the plurality of fuel cell systems on the basis of a result of comparing the required power with a threshold value, and
wherein the control device selects a fuel cell system to be operated from among the plurality of fuel cell systems on the basis of a result of comparing temperatures of the plurality of fuel cell systems with a threshold value.

* * * * *